United States Patent
Bheemanna (10) Patent No.: US 8,819,433 B2
(45) Date of Patent: Aug. 26, 2014

(54) MESSAGE STORAGE AND RETRIEVAL

(75) Inventor: Sudha Bheemanna, Bangalore (IN)

(73) Assignee: Nokia Corporation, Espoo (FI)

( * ) Notice: Subject to any disclaimer, the term of this patent is extended or adjusted under 35 U.S.C. 154(b) by 156 days.

(21) Appl. No.: 13/062,219

(22) PCT Filed: Sep. 3, 2009

(86) PCT No.: PCT/IB2009/053841
§ 371 (c)(1),
(2), (4) Date: Mar. 3, 2011

(87) PCT Pub. No.: WO2010/026540
PCT Pub. Date: Mar. 11, 2010

(65) Prior Publication Data
US 2011/0154040 A1    Jun. 23, 2011

(30) Foreign Application Priority Data

Sep. 3, 2008    (GB) .................................. 0816062.4

(51) Int. Cl.
*H04L 9/32*    (2006.01)
(52) U.S. Cl.
CPC ........................................ *H04L 9/32* (2013.01)
USPC .......................................................... 713/170
(58) Field of Classification Search
CPC ........................................................ H04L 9/32
USPC .......................................................... 713/170
See application file for complete search history.

(56) References Cited

U.S. PATENT DOCUMENTS 6,636,965 B1 * 10/2003 Beyda et al. ................... 713/152
2010/0024037 A1 * 1/2010 Grzymala-Busse et al. .... 726/26

FOREIGN PATENT DOCUMENTS

| | | | |
|---|---|---|---|
| EP | 2028829 A | 2/2009 | |
| KR | 20040085735 A | 10/2004 | |
| KR | 20050000751 A | 1/2005 | |
| KR | 20060112900 A | 11/2006 | |
| KR | 20070006348 A | 1/2007 | |
| KR | 20070012596 A | 1/2007 | |

OTHER PUBLICATIONS

International Search Report and Written Opinion received in corresponding Patent Cooperation Treaty Application No. PCT/IB2009/53841, dated Nov. 10, 2009, 14 pages.

* cited by examiner

*Primary Examiner* — Jacob Lipman
(74) *Attorney, Agent, or Firm* — McClure & Associates PLLC (57) ABSTRACT

A method of obfuscating messages stored in a message store or messages received by a computing device by comparing portions of the messages to user-specified criteria and encrypting or hiding portions of the message if the criteria are matched. The obfuscated messages are stored and access thereto is controlled by only permitting authorized users or applications to decrypt or access the message.

19 Claims, 9 Drawing Sheets

MESSAGE STORAGE AND RETRIEVAL

RELATED APPLICATION

This application was originally filed as Patent Cooperation Treaty Application No. PCT/IB2009/053841 filed Sep. 3, 2009, which claims priority to Great Britain Application No. 0816062.4 filed Sep. 3, 2008.

TECHNICAL FIELD

Embodiments of this invention relates to the storage and retrieval of messages and, in particular, the obfuscation and clarification of messages during storage and retrieval.

SUMMARY OF EMBODIMENTS OF THE INVENTION

Example embodiments of the invention extend to a method, the method comprising:
  determining at least one criteria for obfuscating information in a message received on a device;
  determining whether said received message meets said criteria;
  if said received message meets said criteria, obfuscating at least a portion of said message; and
  if said message does not meet said criteria, leaving said received message in a received format.

Determining whether a received message meets said criteria may be performed for each message in a message store.

Determining whether a message meets said criteria may be performed for each message received by said device.

The criteria may relate to a message sender. In certain embodiments the criteria relate to contact information such as a sender's name, telephone number, address, message centre number, company etc. Said criteria may be specified by setting an appropriate flag which corresponds to one or more message senders.

Obfuscating said message may include the step of encrypting a portion of said message. Where the message is an SMS message, the SMS message may include a body portion. In this instance, only the body portion may be encrypted.

Said method may further comprise requesting a user identification from said user and using said user identification as a seed in said encryption of said message.

Obfuscating said message may comprise displaying said message without said portion.

Further embodiments of the invention extend to an apparatus, said apparatus comprising:
  a processor,
  memory including computer program code,
  the memory and the computer program code configured to, with the processor, cause the apparatus at least to perform:
    determine at least one criteria for obfuscating information in a message received on a device;
    determine whether said received message meets said criteria;
    if said received message meets said criteria, obfuscating at least a portion of said message; and
    if said message does not meet said criteria, leaving said received message in a received format.

Further embodiments of the invention extend to a method, the method comprising:
  receiving a request for access to one of a plurality of messages, said messages being stored in a message store on a device;
  determining whether at least a portion of said requested message is stored in obfuscated form;
  if at least a portion of said message is stored in obfuscated form, requesting authentication; and
  allowing access to said portion of said requested message if said authentication is successful.

In example embodiments, said message store is adapted to store a plurality of messages in plain form and a plurality of messages in obfuscated form, each of said messages complying with a standardised format, said standardised format defining a body portion for each message, wherein each of said messages stored in obfuscated form include an encrypted body portion.

In further embodiments only a portion of the message is stored in obfuscated form.

Said message store may include a plurality of SMS messages and may be adapted to store said SMS messages so that a body portion of an SMS message may be stored in obfuscated form.

Requesting authentication may comprise prompting a user for a user identification.

Allowing access to said requested message may comprise the step of decrypting an encrypted portion of the message. In a further embodiment, allowing access to said requested message comprises showing a previously hidden portion of the message.

Where the message comprises an encrypted portion, encrypting said message may comprise utilising said user identification in said decryption.

Alternatively, or additionally, said step of requesting authentication may comprise verifying the identity of an application requesting said requested message and, in this case, the application is provided with access to a previously encrypted or hidden portion of the message only if the authentication is successful.

Further embodiments extend to an apparatus, the apparatus comprising:
  a processor,
  memory including computer program code,
  the memory and the computer program code configured to, with the processor, cause the apparatus at least to perform:
    receiving a request for access to one of a plurality of messages, said messages being stored in a message store on a device;
    determining whether at least a portion of said requested message is stored in obfuscated form;
    if at least a portion of said message is stored in obfuscated form, requesting authentication; and
    allowing access to said portion of said requested message if said authentication is successful.

Further embodiments extend to an apparatus, the apparatus comprising:
  a message store configured to store a plurality of messages, each message stored in said store having more than one portion; and
  a message parser configured to:
    receive access requests for access to messages stored in said message store;
    determine whether a portion of said requested message is protected;
    in response to determining that a portion of said requested message is protected, request authentication; and
    provide access to portions of the messages stored in said message store in dependence on a response to said authentication.

BRIEF DESCRIPTION OF THE DRAWINGS

Embodiments of the invention are hereinafter described with reference to the accompanying diagrams where.

DESCRIPTION OF EMBODIMENTS

A description of a number of embodiments of the invention follows, provided by way of example only.

Mobile communication devices are generally considered personal devices and the security of these devices has previously been implemented accordingly. Usually a centralised security system operates on such devices where, for example, a personal identification number (PIN) is used to block all access to the device by unauthorised persons. However, as the device is considered as personal, users tend to avoid locking their devices unless they anticipate that the device will be placed in a high risk environment.

The use of the PIN to lock the system suffers from the disadvantage that a choice has to be made between locking the entire device or providing access to the entire device (it is not possible to obfuscate portions of the data on the device).

The PGP Corporation provides software which allows a user to obfuscate selected data using a private key, public key encryption system. Decryption and encryption can be memory and processor intensive operations and it is therefore desirable to keep these operations to a minimum; specifically on a mobile computing device where these resources may be relatively scarce.

Mobile communication devices are increasingly used to complete sensitive transactions and to receive and/or transmit personal data and therefore a user may wish to control access to the data. For example, certain banks provide for the receipt of bank account-related information by means of SMS messages or emails which are received by, and stored on, mobile communication devices. Furthermore, banking systems are known where a mobile communication device acts as a means for identifying the user of the device thereby allowing the user to transfer funds by sending appropriately formatted SMS messages.

Locking the entire device to protect certain sensitive data is cumbersome.

Figure 1:
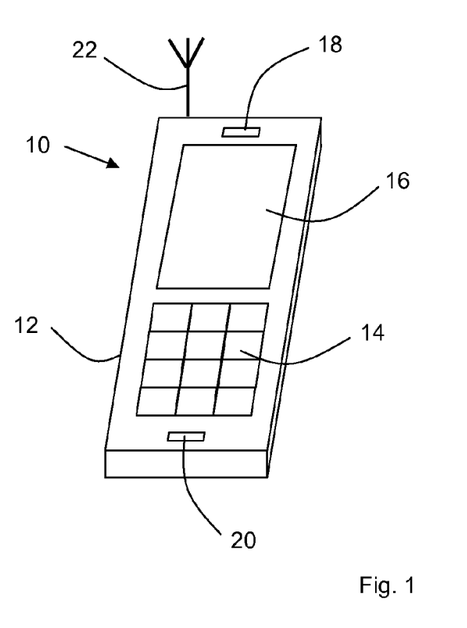
FIG. 1 is a schematic diagram of a mobile computing device in which embodiments of the invention have been implemented.

FIG. 1 is a schematic diagram of a mobile computing device 10 having a casing 12. The computing device 10 forms the basis of the embodiments to be described. The casing 12 of the device 10 encapsulates a keypad 14, a display 16, a speaker 18 and a microphone 20. The device 10 further includes an antenna 22. The device 10 illustrated in FIG. 1 is a mobile device in that it may be held in a user's hand and used to participate in communication sessions, in particular, telephone calls. During such sessions the device 10 may be utilised so that the speaker 18 is held to a user's ear and the microphone 20 is situated in proximity to a user's mouth. Although the embodiments described relate to a mobile computing device, it is to be realised that the invention is not limited in this respect. Further embodiments of the invention may be implemented on computing devices which are not mobile.

Figure 2:
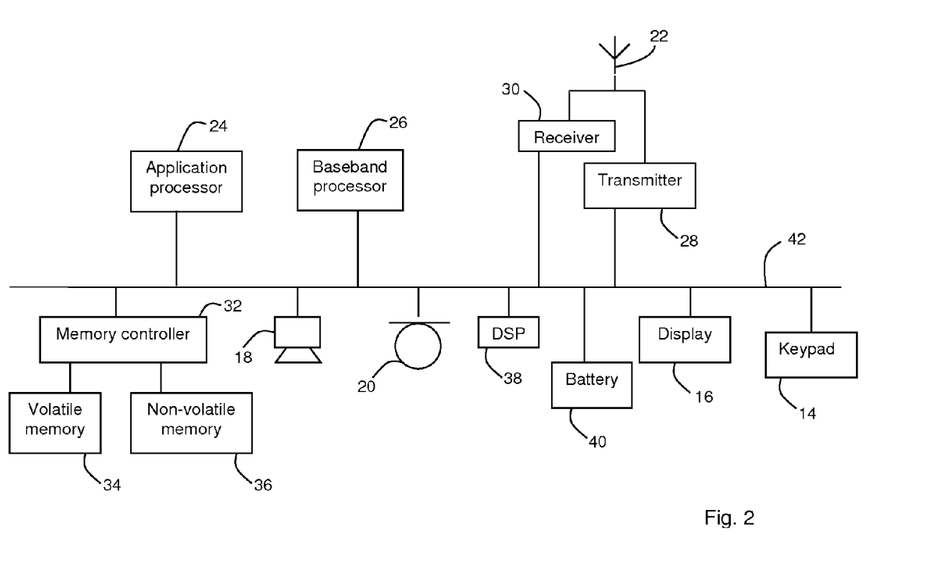
FIG. 2 is a schematic diagram of hardware components of the mobile computing device of FIG. 1.

FIG. 2 is a schematic illustration showing the arrangement of certain of the hardware components of the device 10 of FIG. 1. The keypad 14, display 16, speaker 18 and microphone 20 are connected to a system bus 42. The bus 42 is further connected to an application processor 24, a baseband processor 26, a digital signal processor (DSP) 38, a transmitter 28, a receiver 30 and a battery 40. Transmitter 28 and receiver 30 are connected to antenna 22. The bus 42 is further connected to a memory controller 32 which is, in turn, connected to a volatile memory 34 and a non-volatile memory 36. The application processor 24 processes instructions related to various software modules and operating system software which run on the device 10 and which provide various functionality of the device 10. The baseband processor 26 is concerned with the communication functions and to this end controls a telephony stack and communicates with the transmitter 28 and receiver 30 to establish communications by means of the antenna 22. The various processing elements of the device 10 such as the application processor 24 and baseband processor 26 may, in an alternate embodiment, be provided on a single processor.

Memory controller 32 controls the access to, and interaction with, volatile memory 34 and non-volatile memory 36. The application processor 24 is able to communicate with the various hardware elements as well as the memory controller 32 and thereby control the operation of the various hardware elements according to software instructions stored on volatile memory 34 or non-volatile memory 36.

Only a single bus, bus 42, is illustrated in FIG. 2. It is to be realised that this bus may be replaced by two or more buses and that the topology of FIG. 2 would vary accordingly. Furthermore, known computing devices include hardware components additional to those illustrated in FIG. 2, but these are well known in the art and are not further described or illustrated herein.

Figure 3:
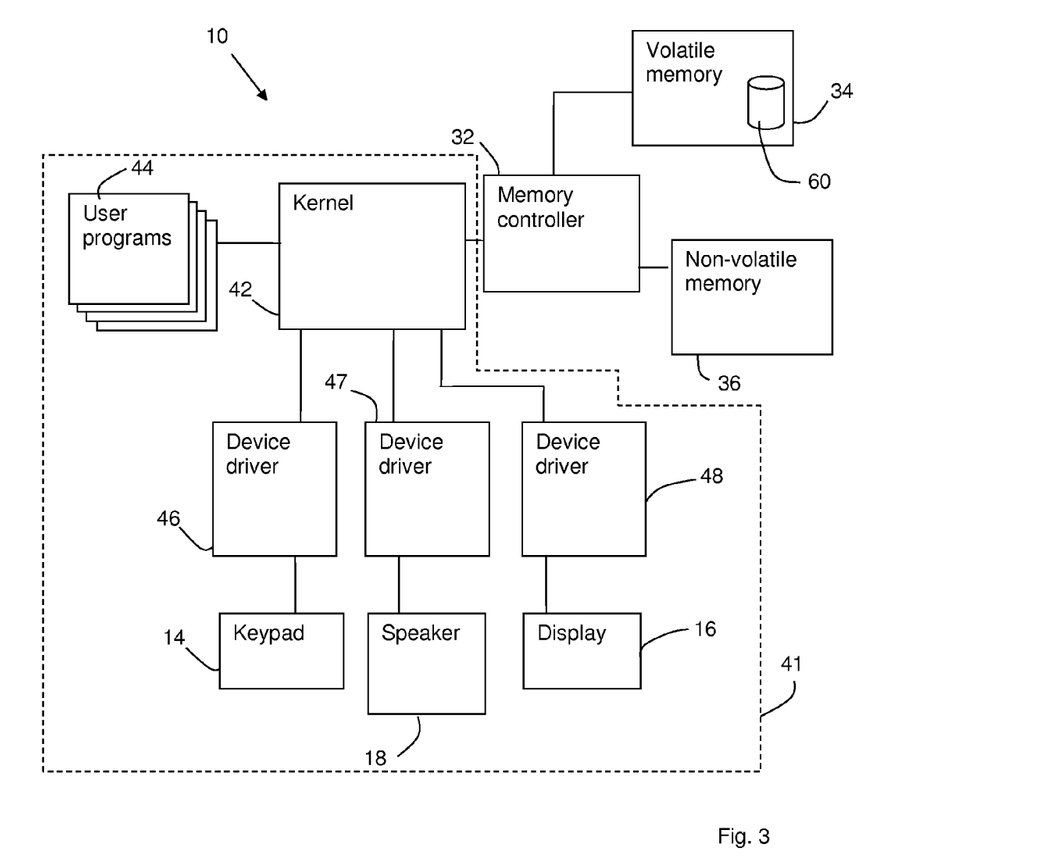
FIG. 3 is a block diagram representing aspects of the mobile computing device of FIG. 1.

FIG. 3 is a diagram illustrating various hardware and software components of the device 10. The software operating on the device 10 can be categorised in various ways. Certain software operates to manage the resources provided by the various hardware components and to establish an operational environment in which other software executes. This software is known as the operating system of the device and is represented in FIG. 3 by a kernel 42. The kernel interacts with the memory controller 32 which, as previously described, is connected to volatile memory 34 and non-volatile memory 36. The kernel 42 is further connected to a plurality of user programs 44 each of which may access the hardware components in a manner dictated by the kernel 42. The kernel 42 is further connected to the keypad 14 by means of device driver 46, to speaker 18 by means of device driver 47 and to the display 16 by means of device driver 48. Only certain of the hardware components have been illustrated but, generally, the kernel 42 controls the hardware resources of the device 10 through various device drivers. Furthermore, although the device drivers have been illustrated as separate to the kernel 42, it is possible for them to be incorporated into the kernel 42.

The software components of FIG. 3 are delineated by dashed area 41. However, this distinction between software and hardware is not essential. Components depicted as software in FIG. 3 may be rendered in hardware, and those depicted as hardware may, in certain circumstances, be rendered as software. Furthermore, some components may have a software portion as well as a hardware portion.

During operation of the device, software instructions stored in non-volatile memory 36 establish the kernel 42, the user programs 44 and the device drivers 46, 47 and 48. Through the use of the various components illustrated in FIG. 3 a user is able to utilise the device 10 according to the functionality provided by the various user programs 44. For example, a user uses the keypad 14 to communicate with the kernel 42 by means of device driver 46 to cause one of the user programs 44 to access data stored on non-volatile memory 36 by means of memory controller 32. The kernel 42 then causes the data supplied by memory controller 32, together with instructions supplied by the user program, to be sent to the application processor 24 (FIG. 2). The application processor 24 will return results from the data and instructions, generally utilising volatile memory 34 in the process, and these will be returned to the user program by the kernel 42. On further instructions from the user program, the kernel 42 will cause the results to be displayed to the user on display 16 by means of device driver 48.

The illustration of FIG. 3 is presented merely by way of example. Known devices on which example embodiments of this invention may operate comprise more or fewer components than those shown. Implementations of certain embodiments of the invention are not dependent on the precise arrangement and configuration of the components shown in FIGS. 1, 2 and 3. Therefore other components with similar functionality may be substituted and further components added thereto or illustrated components omitted therefrom without affecting the operation of certain embodiments of the invention.

Volatile memory 34 (which in this embodiment is a flash drive) includes a message store 60.

Figure 4:
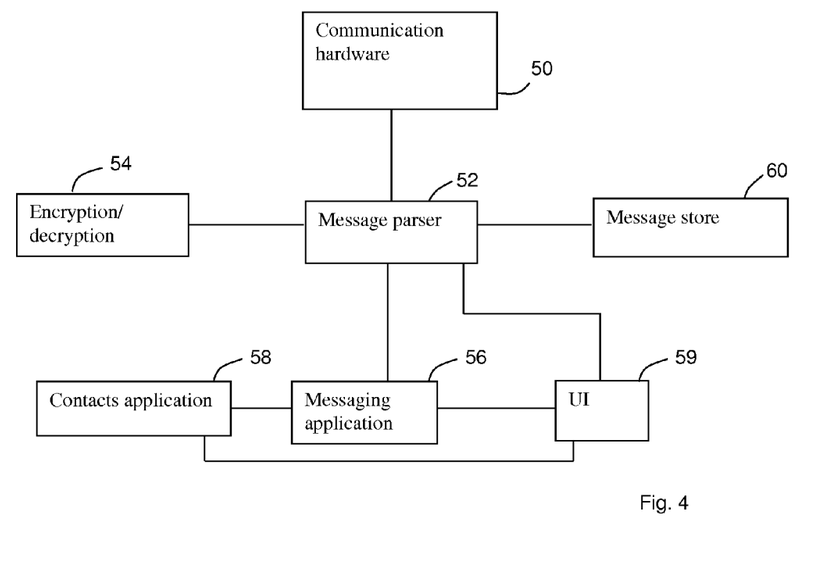
FIG. 4 is a schematic diagram of subcomponents of the mobile computing device of FIG. 1.

FIG. 4 illustrates the manner in which certain components of the mobile computing device 10 are interconnected. Communication hardware 50 (which includes the antennae 22, receiver 30, transmitter 28, DSP 38, baseband processor 26 and other devices involved in the reception of communications) are connected to a message parser 52. The message parser 52 is an application operating within the kernel 42 and is connected to a messaging application 56 and a contacts application 58, both of which are user applications 44 (FIG. 3). The user uses messaging application 56 to view and compose messages in conjunction with the contacts application 58. The contacts application 58 is used in a manner known in the art to store contact information which may be specific to an individual or to an organisation. The message parser 52 has a user interface 59 which is used to specify criteria according to which it is determined whether messages are to be obfuscated, as described below. The user interface 59 is connected to the contacts application 58 and the message parser 52.

In this embodiment, the messaging application 56 deals with SMS messages and emails. However, the processes discussed herein are equally applicable to messages of other types and to any collection of communications-related data which may be accessed in a piecemeal manner. In the embodiment illustrated the message parser 52 is a software application arranged to intercept all incoming messages and all attempts to access the message store 60. In an alternate embodiment, the message parser 52 is implemented in hardware.

The message parser 52 is connected to a decryption and encryption algorithm 54 which the parser uses to encrypt and decrypt messages as hereinafter described. The message parser 52 is also connected to the message store 60 which is stored in the system memory 38 (FIG. 3). In this embodiment the message store 60 stores SMS messages which are accessed by the messaging application 56.

When data is received, it is first processed by the communications hardware 50 which determines if the data relates to a message or not. If the data does relate to a message, the communications hardware 50 will pass the data on to the message parser 52 which operates as described below to encrypt portions of the message as required using the encryption and decryption algorithm 54. The message parser will then pass the message (whether encrypted or not) to the messaging store 60 and inform the messaging application 56 that a new message has been received. The user interacts with the other components illustrated in FIG. 4 by means of the messaging application 56. Therefore, when a new message is received, the messaging application 56 will notify the user. Similarly, when the user wishes to access one of the messages stored in the message store 60, this is done by the user entering the appropriate input into the messaging application which requests the appropriate message from the store 60 and the message parser will decrypt or encrypt the message, if appropriate. The arrangement whereby a user directs an application to access stored messages is well known in the art. Furthermore, the reception of messages and their storage in a message store are also well known. The present invention differs in the disposition of the message parser 52 between the message store 60 and the other components illustrated in FIG. 4.

Figure 5:
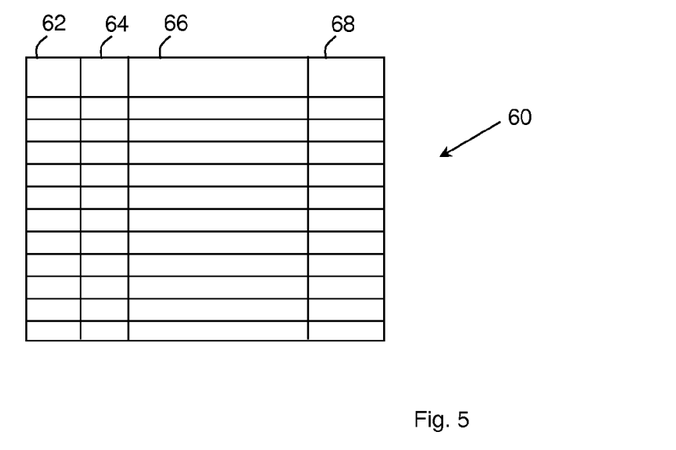
FIG. 5 is a schematic diagram of a structure of a message store utilised by the computing device of FIG. 1.

FIG. 5 is a schematic diagram of a structure of the message store 60 arranged as a table. The table of the message store includes a plurality of rows, where each row corresponds to a message. Different portions of the messages are stored in the different columns of the table. Column 62 corresponds to a message id which the messaging application 56 (FIG. 4) uses to identify the messages. Column 64 corresponds to a header for the message. The header contains sufficient information to identify the message and will depend on the type of messages involved. The message store 60 stores SMS messages and, therefore, the header of each message comprises the telephone number of the sender of the message and a timestamp detailing when the message was received. It is to be realised that the message store 60 may in further embodiments, store email messages or other kinds of messages. Furthermore, in further embodiments, the computing device 10 comprises more than one message store, each store storing different kinds of messages or comprises a single store adapted to store different kinds of messages. Further embodiments of the invention are applicable to many kinds of message stores. If the messages are emails, the header will comprise routing information, information pertaining to the sender and to the content of the message and information regarding the date the message was sent and received.

The arrangement of messages into body portions and header portions is well known in the art. Often the manner in which this arrangement occurs is specified in a standard. For example, the format for SMS messages is specified in GSM 03.40/1 "Technical Realisation of the Point-to-point Short Message Service", 23 Sep. 1988, currently maintained by the 3rd Generation Partnership Project (3GPP). The message store 60 is arranged accordingly so that portions of the message defined by this standard correspond to columns of the table depicted in FIG. 5. It is therefore relatively easy and simple to ensure that the correct portion of the messages stored in the store are encrypted or decrypted as the same operation may be applied to all selected data stored in a particular column.

Column 66 of the message store 60 comprises the body of the SMS message. In this manner the body of the message is stored separately to the header and other identifying information. This allows the body to be obfuscated while retaining sufficient information in unobfuscated form to allow identification and manipulation of the message. This allows the messages to be stored and easily sorted and referenced by the unobfuscated information without revealing the sensitive data contained in the body portion. Lastly, column 68 corresponds to a tag for the message used to indicate whether the message includes obfuscated content.

It is to be realised that the above discussion of SMS message store 60 of FIG. 5 is equally applicable to other message stores.

Example embodiments of the invention are capable of operating in one of two modes. In the first mode, a user specifies a criteria and all messages stored in the message store are tested to determine if they meet the criteria and, if they do, the bodies of the messages which meet the criteria are obfuscated. In the second mode, all incoming and accessed messages are tested against previously determined criteria and the bodies of the messages are obfuscated if they meet that criteria.

Figure 6:
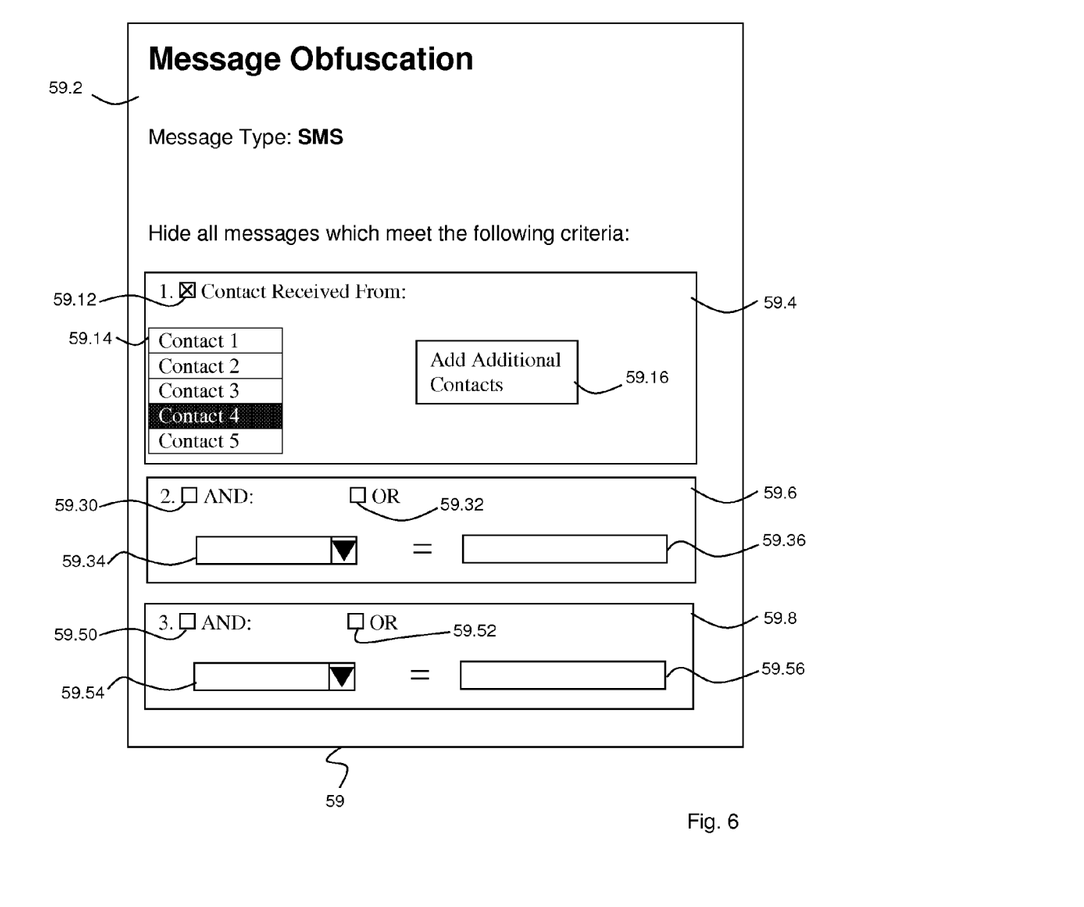
FIG. 6 is a schematic diagram of a user interface for use with the computing device of FIG. 1.

FIG. 6 illustrates the user interface 59 used by a user of the device 10 to specify the criteria according to which the message parser 52 determines whether a message is to be obfuscated.

The user interface 59 includes an information section 59.2 where identifying information, including an indication of the type of message to which the criteria to be specified apply, is displayed. The remainder of the user interface 59 is divided into three areas 59.4, 59.6, and 59.8. Each of these areas has a corresponding check box 59.12, 59.30, and 59.50. A user checks the corresponding check box to determine whether the rules specified within that area are to apply to received messages. As illustrated in FIG. 6, the box corresponding to area 59.4 has been checked whereas the check boxes 59.30 and 59.50 have not been checked. The area 59.4 in this instance includes a list of contacts 59.14. These contacts are retrieved from the contacts application 58 (as shown in FIG. 4). FIG. 6 illustrates the first five contacts labelled "Contact 1" through to "Contact 5", but provision can be made to display more contacts (for example, by means of a scrolling list). As illustrated in FIG. 6, Contact 4 has been selected in this example. The area 59.4 further includes a button 59.16 labelled "Add Additional Contacts" and, upon activation of the button 59.16, a further list of contacts similar in appearance to list 59.14 is displayed and a user is given the opportunity to select further contacts from this list.

Provided the check box 59.12 has been checked and at least one of the contacts displayed has been selected, all messages received from the selected contact or contacts will be obfuscated as hereinafter described.

It will be realised that the selection of contacts need not correspond to a single person but could correspond to a group of people, all identified through a single entry in a contacts list. For example, provision could be made to identify all communications received from a particular company through a single contact entry. In this instance, the selection by a user of a single contact would result in the obfuscation of messages received from multiple devices.

Furthermore, it is to be realised that the mode of entering a contact as the criteria by which messages are obfuscated is not limited to SMS messages as illustrated in FIG. 6. Where, for example, criteria are specified by which email messages are to be obfuscated, user interface corresponding to that illustrated in FIG. 6 is provided in which a user is able to select names (or other information) from a contacts list.

The user interface 59 further includes areas 59.6 and 59.8 which provide for the specification of additional (or alternate) criteria by which messages are to be obfuscated. Area 59.6 includes check boxes 59.30 and 59.32 which specify whether the criteria to be specified in this are will apply in addition to, or as an alternate to, the criteria specified in area 59.4. A drop-down list 59.34 provides a means whereby the user can select other criteria which will govern whether a received message is obfuscated. In this embodiment the drop-down menu 59.34 includes options to select one of the following: message centre number, message length, message begins with, message ends with, and message sender number. A input box 59.36 is further provided in area 59.6 for a user to enter the criteria according to which the selected field will be evaluated.

Area 59.8 operates in a manner similar to that of area 59.6 and includes check boxes 59.50 and 59.52 to specify whether the criteria apply in addition to, or as an alternate to, the criteria specified in areas 59.6 and 59.4. A drop-down menu 59.54 is provided for selecting the type of criteria and an input box 59.56 is provided for a user to enter the corresponding criteria.

The manner in which such rules are specified by users is well known in the art, and will therefore not be further described herein. It is to be realised that the areas 59.6 and 59.8 may be appropriately modified where email messages are concerned. In this case, the drop-down menus 59.34 and 59.54 will contain criteria specific to email messages.

It is to be realised that it is not necessary for the operation of example embodiments of the invention for a user interface of the type 59 illustrated in FIG. 6 to be utilised to specify the criteria according to which it is determined whether messages are obfuscated. In an alternative embodiment, the contacts application 58 includes a check box corresponding to the entry for a particular contact which, when checked, will ensure that all messages received from that contact are obfuscated.

In certain embodiments of the invention, where a user of said device may determine the criteria for obfuscating said information, the user is able to specify any message-related information which will be used to determine if a message should be obfuscated.

Figure 7:
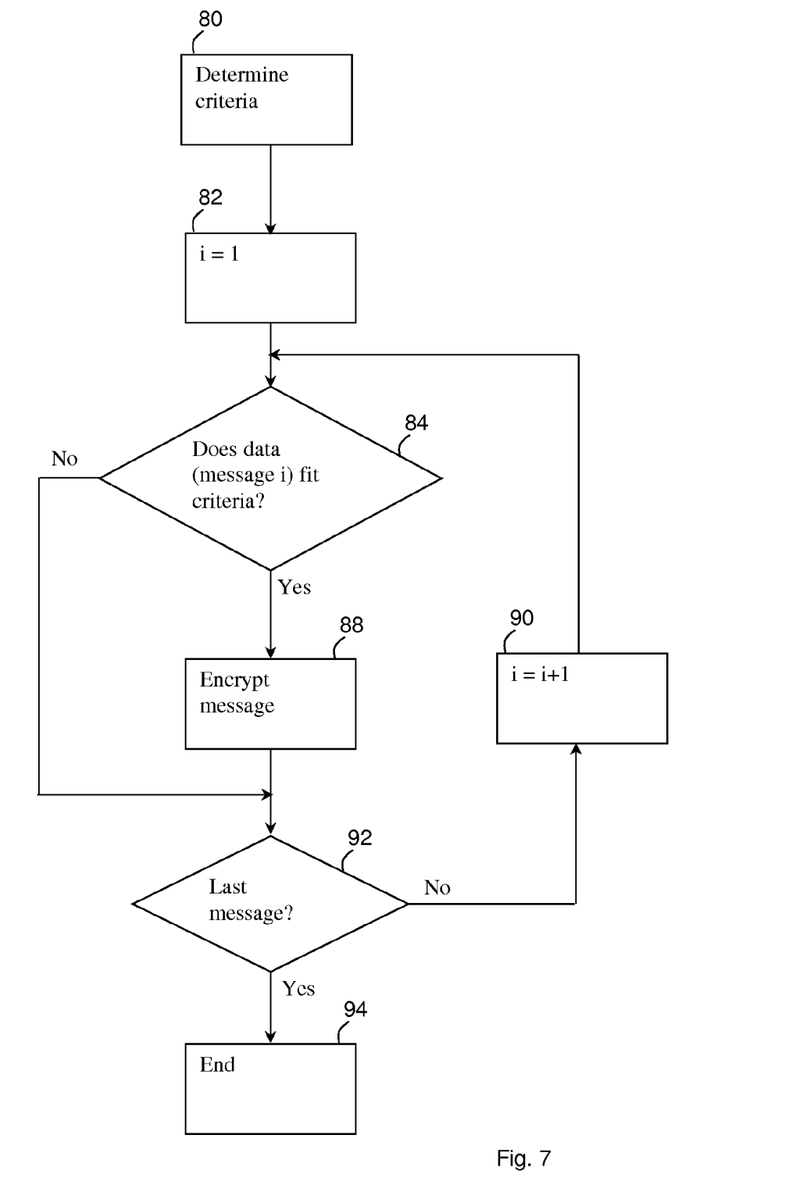
FIG. 7 is a flow diagram of a process of obfuscating message information.

FIG. 7 is a process diagram illustrating the operation of an embodiment of the invention according to the first mode in which a user specifies a criteria according to which messages stored in the message store 60 are to be obfuscated. This mode will arise when, for example, a user incorporates a previously generated message store into a computing device incorporating example embodiments of the invention. Alternatively, the user may wish to take a computing device from a trusted environment to an untrusted environment and obfuscate previously received messages according to determined criteria before doing so.

In block 80, the criteria according to which messages are to be obfuscated are determined. In this embodiment the criteria are determined by having a user input the criteria into the user interface 59 of FIG. 6. In alternative embodiments, the criteria may be communicated to the device 10 over a network or may be specified by another application running on the device 10. The criteria will be dependent on the type of message under consideration. For the purposes of illustration, it is assumed that the criteria corresponds to a sender's telephone number and that the messages are SMS messages.

At block 82 an integer i is set equal to 1. Integer i acts as an index for parsing all messages stored in the message store 60. At the following block, block 84, the criteria specified at block 80 is compared against the SMS message corresponding to the current value of i. As i is currently set equal to 1, a comparison is made between the sender's telephone number specified in block 80 and the sender's telephone number of the first message of the message store 60 (i.e. the message of the first row of FIG. 5). Blocks 82 and 84 will be performed by the message parser 52. If the first message matches the specified criteria, the process will proceed to block 88 where the message parser passes the message to the decryption and encryption algorithm 54 which encrypts the body of the message. Once the body of the message has been encrypted, the original body is deleted and replaced by the encrypted body. The tag (c.f. column 68 of FIG. 5) is set to indicate that the message includes encrypted content.

If, on the other hand, the criteria and the message do not match, the process will proceed to block 92 where it is determined whether all messages stored in message store 60 have been compared against the user specified criteria.

If all messages have been considered, the process is terminated at block 94. If there are other messages to be considered, the process will proceed to block 90 where the value of integer i is incremented and the process returns to block 84 to compare the second message to the criteria.

In this manner each of the messages stored in the message store will be compared to determine whether it matches the criteria specified and, if it does, the body of the message will be replaced with an encrypted copy thereof.

Various forms of encryption and obfuscation are known and the invention is not limited in this respect. In one embodiment of the invention, use is made of the PGP Password Based Key Derivation Function 2 (PBKDF2) where a user specified password is used to derive a key which is used for encryption and decryption. Using a user authentication as a seed for the encryption allows the steps of authentication and decryption to be linked further ensuring that only an authorised person is permitted access to sensitive information.

Storing a portion of the message as plain text and a portion thereof as encrypted text allows efficient operation of the message store and simple application of decryption and encryption algorithms to portions of the stored messages. Where all portions of the message other that the body are maintained in plain or unobfuscated form, the messages may be sorted and otherwise managed and manipulated according to the plain information. This is quicker than having to perform a decryption operation every time the message is to be accessed.

Encryption of the message body is the preferred form of obfuscation as it provides a secure method of hiding the relevant information. However, the encryption suffers from the disadvantages that it is processor intensive. Therefore, in an alternative embodiment, the message parser 52 does not encrypt the message body but reformats the message by deleting the message body from a copy of the message passed to the messaging application 56. In this embodiment, the message stored in the message store 60 is not altered. Instead, the message parser obfuscates the necessary information by hiding it from the messaging application 56 and therefore from a user accessing the message by means of the messaging application 56. In certain embodiments, only information relating to received messages which meet the criteria is obfuscated. This keeps the obfuscation operations to a minimum, therefore optimising the use of available resources.

Determining whether a received message meets said criteria may be performed for each message in a message store. Therefore, example embodiments of the invention may be installed or operated on a computing device with an existing message store and a user is able to specify criteria to apply to previously received messages.

Figure 8:
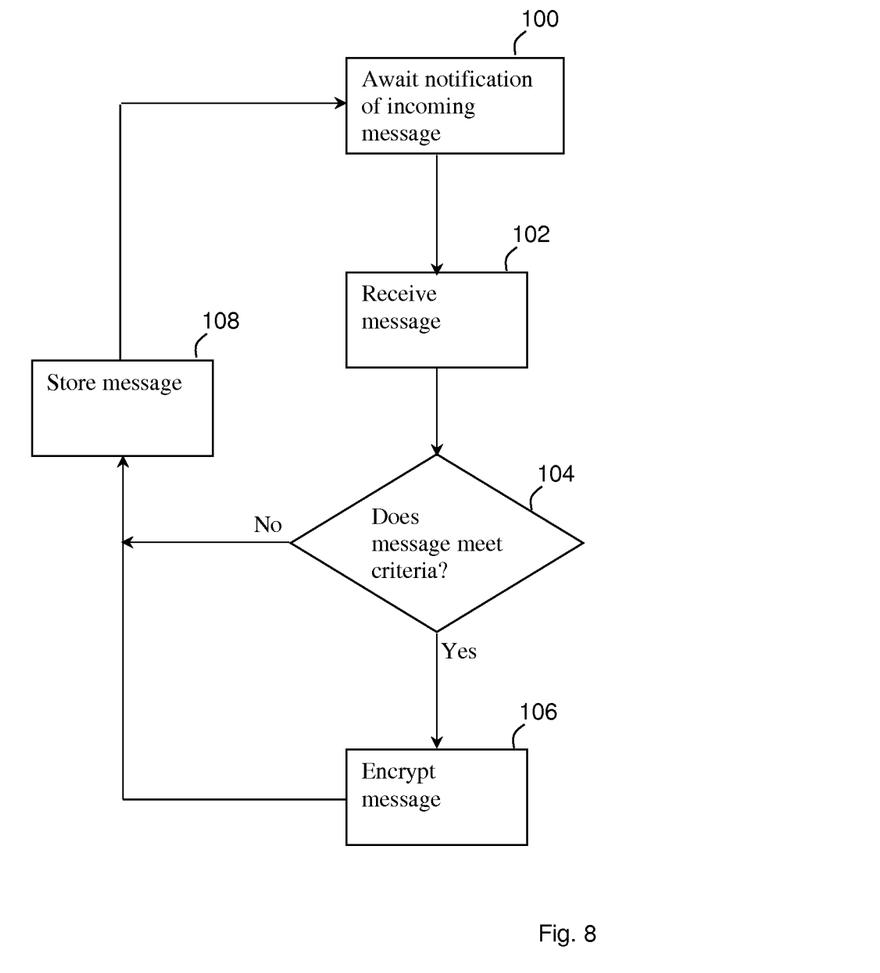
FIG. 8 is a flow diagram of a process of obfuscating message information of an incoming message.

In the second mode of operation, each message received by the communications hardware 50 is compared to predetermined criteria to determine whether the message should be obfuscated. FIG. 8 illustrates a process according to this mode of operation.

At block 100 the message parser 52 waits notification that a message has been received from the communications hardware 50. Once the message has been received by the communications hardware 50, the message is passed to the message parser 52 in block 102. At block 104 the message is compared to the specified criteria by the message parser 52. In this embodiment, the message parser 52 includes a store (not shown) where all of the specified criteria are stored and the parser 52 compares each received message against each of the stored criteria. In the embodiment shown, the criteria has been specified by a user and is a sender's telephone number, although it is to be realised that embodiments of the invention are equally applicable to other criteria and a number of different criteria may be specified.

If the message meets the criteria, the process proceeds to block 106 where the body of the message is encrypted by the encryption and decryption algorithm 54. The encrypted content flag will also be set here (column 68 of FIG. 5).

If the message does not meet any of the specified criteria when processed in block 104 or once the body of the message has been encrypted in block 106, the message is written to the message store 60 at block 108. The process will then return to block 100 to await notification of the next message which will be processed in the same manner according to FIG. 7.

Referring back to FIG. 4, any application such as messaging application 56 having access to the message store 60 will do so through the message parser 52. Therefore, the message parser 52 will determine whether the application is entitled to access that message.

Figure 9:
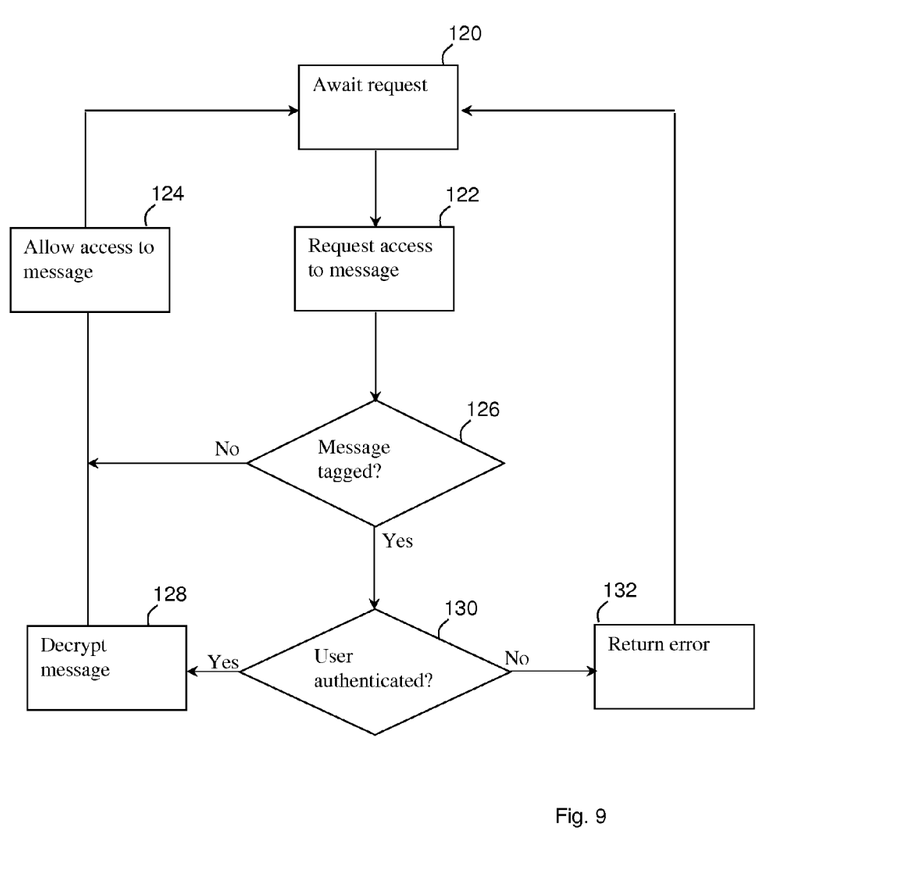
FIG. 9 is a flow diagram of a process of decrypting a previously obfuscated message.

FIG. 9 illustrates the process by which the message parser 52 determines whether messaging application 56 is permitted access to a message stored in the message store 60. Although FIG. 9 refers to the operation of message application 56, it is to be realised that similar considerations apply in respect of the access of a message by any other application.

By providing applications with controlled access to the messages, the integration of various applications on a computing device, such as a mobile computing device, is permitted. For example, a banking application could then be permitted to access the encrypted portions of messages to use this information to access the user's bank account.

Initial block 120 represents a waiting state where the message parser awaits a request by the messaging application 56 to access a message stored in message store 60. At block 122 a request from the messaging application to access a message stored in the store 60 is received. The messaging application will identify the requested message by the message id of that message. At block 126 the message parser will query the message store 60 to determine if that message includes encrypted content. This is done by verifying whether the encrypted content flag has been set for that message.

If the encrypted content flag has not been set for that message, the process will proceed to block 124 where access is allowed by the messaging application 56 to the requested message.

If the tag has been set, the process continues on to block 130 where it is determined whether the user has rights to access the encrypted content of the message. In the case where PBKDF2 is used to encrypt the relevant portions of the messages, the user will be prompted for the relevant password at block 130. In alternate embodiments, other forms of authentication may be performed. In an alternative embodiment, the application is authenticated (as opposed to the user) by having the messaging application 56 provide a key to the message parser which the message parser is able to verify.

If the user (or application) is not authenticated in block 130, the process will proceed to block 132 where an error is returned to the messaging application to indicate that access to the requested message is not permitted. Alternatively to returning an error, the message may merely allow access to the encrypted message (to thereby allow the user to view the unencrypted portions of the message). Once this is done, the process will return to the first block, block 120 awaiting a further request to access a message.

However, if the user passes the authentication of block 130, the process will continue to block 128 where the message parser 52 calls the encryption and decryption algorithm 54 which decrypts the encrypted body portion of the message and passes the plaintext of this back to the message parser 52. The process will then continue to block 124 where the messaging application 56 is allowed to access to the now decipherable message. Finally, the process will return to the initial block 120 to await a further access request.

In the aforementioned example embodiment where the message body is obfuscated by deleting it from a copy of the message passed by the message parser 52 to the messaging application 56 (or by only passing the header portion of the message requested by the messaging application 56), block 128 entails the message parser 52 accessing the complete message stored in the message store 60 and, in block, 124 passing the complete message to the messaging application 56 for display to the user. In this embodiment, the user authentication will occur independently of the obfuscation or display of the message. This is less computationally intensive than providing encryption and subsequent decryption. In this instance user authentication is not linked to obfuscation.

As previously mentioned, the message parser 52 may operate in two modes, the second of which is represented in FIGS. 7 and 8. Therefore the parser may await either an incoming message or a request by a messaging application to access a message and once received follow the appropriate procedure (i.e. block 100 of FIG. 8 may represent the same state as block 120 of FIG. 9 for the message parser).

It will be understood by the skilled person that alternative implementations are possible, and that various modifications of the methods and implementations described above may be made within the scope of the invention, as defined by the appended claims. It should also be noted that any combination of the features and process elements described herein may be combined or omitted in different embodiments of the invention.

The invention claimed is:

1. A method comprising:
    determining at least one criterion comprising contact information relating to a message sender for obfuscating information in a message received on a device;
    determining whether said message meets said criterion;
    if said message meets said criterion, obfuscating only a portion of said message; and
    if said message does not meet said criterion, leaving said message in a received format.

2. The method according to claim 1 wherein a user of said device is enabled to determine said criterion for obfuscating information.

3. The method according to claim 1 wherein obfuscating the portion of said message comprises displaying said message without said portion.

4. The method according claim 1 further comprising requesting a user identification from said user and using said user identification as a seed in encrypting the portion of said message to obfuscate the portion of said message.

5. The method of claim 1, further comprising:
    receiving a request for access to said message;
    requesting authentication; and
    allowing access to said portion of said requested message based, at least in part, on a determination that said authentication was successful.

6. An apparatus comprising
    a processor,
    memory including computer program code,
    the memory and the computer program code configured to, with the processor, cause the apparatus at least to perform:
    determine at least one criterion comprising contact information relating to a message sender for obfuscating information in a message received on a device;
    determine whether said message meets said criterion;
    if said message meets said criterion, obfuscate only a portion of said message; and
    if said message does not meet said criterion, leave said message in a received format.

7. The apparatus according to according to claim 6 wherein the memory and the computer program are configured to, with the processor, cause the apparatus to enable a user of said device to determine said at least one criterion for obfuscating information.

8. The apparatus according to claim 6 wherein obfuscation of the portion of said message comprises displaying said message without said portion.

9. The apparatus according claim 6 wherein the memory and the computer program are configured to, with the processor, cause the apparatus to request a user identification from said user and use said user identification as a seed in encrypting a portion of said message to obfuscate at least a portion of said message.

10. The apparatus of claim 6, wherein determination of whether said message meets said criteron comprises determining that said message was sent by said message sender.

11. The apparatus of claim 6, wherein the contact information relates to at least one of an email address or a phone number.

12. The apparatus of claim 6, wherein obfuscation of only a portion of said message relates to obfuscation of a message body and leaving a header of said message in said received format.

13. The apparatus of claim 6, wherein obfuscation of only a portion of said message relates to obfuscation of a message body and leaving of said contact information of said message in said received format.

14. The apparatus of claim 6, wherein the memory and the computer program code are further configured to, with the processor, cause the apparatus at least to perform:
    receive a request for access to said message;
    request authentication; and
    allow access to said portion of said requested message based, at least in part, on a determination that said authentication was successful.

15. The apparatus according to claim 14, further comprising storage of said message in a message store that is configured to include a plurality of messages such that a body portion of said message is stored in obfuscated form.

16. The apparatus according to claim 14, wherein request authentication comprises prompting a user for a user identification.

17. The apparatus according to claim 14, wherein said obfuscation comprises hiding said portion from unauthorised access and wherein allowing access to said message comprises displaying said obfuscated portion of said message.

18. A computer program product comprising a non-transitory computer-readable medium bearing computer program code embodied therein for use with a computer, the computer program code comprising:
- code for determining at least one criterion comprising contact information relating to a message sender for obfuscating information in a message received on a device;
- code for determining whether said message meets said criterion;
- code for, if said message meets said criterion, obfuscating only a portion of said message; and
- code for, if said message does not meet said criterion, leaving said message in a received format.

19. The computer program product comprising of claim 18, wherein the computer program code further comprises:
- code for receiving a request for access to said message;
- code for requesting authentication; and
- code for allowing access to said portion of said requested message based, at least in part, on a determination that said authentication was successful.

* * * * *